F. W. MERRICK.
JOINT FOR ARTIFICIAL LIMBS.
APPLICATION FILED MAR. 25, 1909.
942,093.
Patented Dec. 7, 1909.
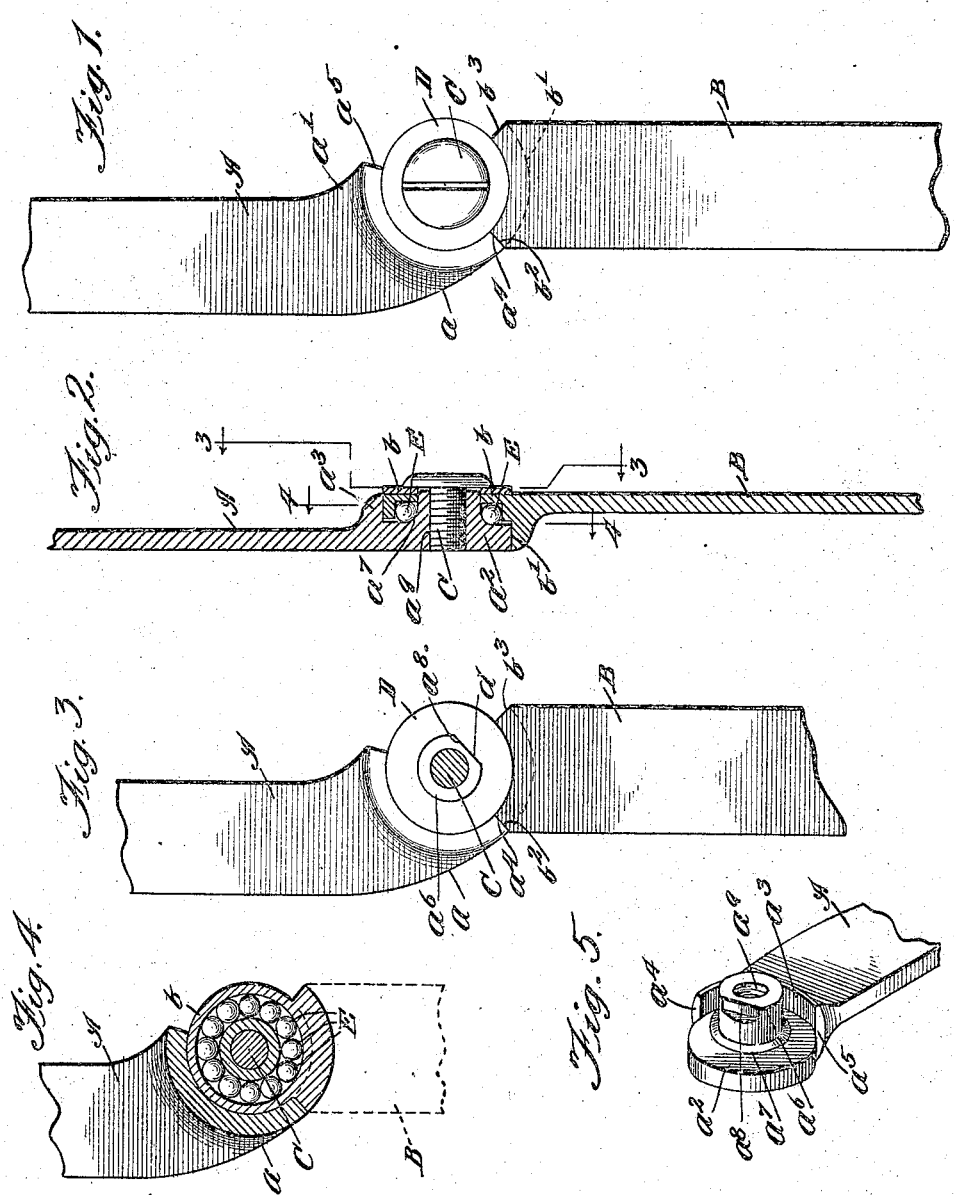
Witnesses:
Inventor:
Frank W. Merrick

UNITED STATES PATENT OFFICE.

FRANK W. MERRICK, OF CHICAGO, ILLINOIS.

JOINT FOR ARTIFICIAL LIMBS.

942,093.

Specification of Letters Patent.   Patented Dec. 7, 1909.

Application filed March 25, 1909.   Serial No. 485,652.

*To all whom it may concern:*

Be it known that I, FRANK W. MERRICK, a citizen of the United States of America, and resident of Chicago, Cook county, Illinois, have invented a certain new and useful Improvement in Joints for Artificial Limbs, of which the following is a specification.

My invention relates to joints for artificial limbs, as, for example, the knee joints for artificial legs. These knee joints have been provided with ball bearings, but they have not, in my judgment, been entirely satisfactory. The construction was, for example, such that if made strong they were too heavy, and if made light they were too weak. Also, the ball bearings were often not as free from friction as might be desired, and were liable to work loose and rattle. All this was objectionable; for obviously a knee joint must be light, strong and noiseless, in order to be entirely satisfactory.

The object of my invention is, therefore, the provision of a joint that will be both light and strong, that will work easily and noiselessly, that will be simple and inexpensive to manufacture, and that will not be liable to work loose or give trouble in use.

In the accompanying drawings—Figure 1 is a side elevation of a joint embodying the principles of my invention. Fig. 2 is a vertical longitudinal section of the same. Fig. 3 is a section on line 3—3 in Fig. 2. Fig. 4 is a section on line 4—4 in Fig. 2. Fig. 5 is a perspective of the end of one member of the joint.

As thus illustrated, the upper member A is curved at its lower end, as at $a$ and $a'$, and is formed with a flat disk-like portion $a^2$. This prtion $a^2$ has a rim $a^3$ at one side thereof, which rim has a shoulder $a^4$ at one end and a shoulder $a^5$ at the other end. A stud $a^6$ is formed centrally upon the inner face of the portion $a^2$, which stud has an inclined base or bevel $a^7$, as shown. This base or bevel $a^7$ is in the form of a ring extending around the base of the stud $a^6$. Said stud is formed with a recess or flat-faced cut $a^8$ at one side of its upper end. A tapped or threaded bore $a^9$ extends through the stud and terminates at the outer face of the portion $a^2$.

The lower member B has its upper end formed with a disk-like portion $b$, which is depressed or hollowed out on the inner face thereof to provide a cup. This portion $b$ has a rim $b'$ at one side thereof, which rim has a shoulder $b^2$ at one end and a shoulder $b^3$ at the other end.

A screw C extends through the threaded bore $a^9$, and its flat head holds a washer D in place on top of the stud $a^6$ and the portion $b$, said washer fitting over the end of said stud. For this purpose the said washer has a straight inner portion $d$ adapted to engage the flat faced recess $a^8$, as shown. Thus the screw and washer are rigid with the upper member A.

Anti-friction balls E are disposed in the annular cavity formed by the cup on the inner face of the portion $b$, which cavity encircles the stud $a^6$. Each ball, it will be seen, has two points of contact with the cup on the member B. The balls are held in the cup by the bevel $a^7$. Thus each ball has only one point of contact with the member A. The said bevel $a^7$ tends to expand the circle of balls in the cup—that is to say, tends to force the balls outwardly against the cup, and away from each other. In this way very slight tightening of the screw C serves to tighten the balls in the bearing, and prevent rattling.

The joint thus constructed works smoothly and easily, and without noise. It is simple and free from complication, and may be manufactured on an economical basis. It does not require an objectionable amount of metal to give it the requisite strength and rigidity.

When the screw is tightened, the balls are forced against the bottom of the cup, as well as against the sides thereof. This tends to prevent loosening of the joint, as it takes up wear and prevents rattle or undue play between the parts in any and all directions.

What I claim as my invention is:

A joint for artificial limbs, comprising a member having a smooth and unbroken inner face, a cylindric stud rising centrally from the said face, an annular bevel or incline encircling the base of said stud, another member having a cup formed in its inner face, an opening in the center of said cup, said opening receiving the end of said stud, balls held in the cup by said bevel or incline, each ball thereby having only three points of contact with the two members of the joint, and means including a screw extending into the stud for crowding the balls outwardly by drawing said bevel or incline into the cup, as set forth.

Signed by me at Chicago, Illinois, this 20th day of March, 1909.

FRANK W. MERRICK.

Witnesses:
CLARENCE E. TAYLOR,
J. NORBY.